(12) United States Patent
Hirayama

(10) Patent No.: US 8,534,584 B2
(45) Date of Patent: Sep. 17, 2013

(54) DUAL-BEARING REEL SPEED CHANGE OPERATION MECHANISM

(75) Inventor: Hirokazu Hirayama, Osaka (JP)

(73) Assignee: Shimano Inc., Osaka (JP)

( * ) Notice: Subject to any disclaimer, the term of this patent is extended or adjusted under 35 U.S.C. 154(b) by 248 days.

(21) Appl. No.: 13/049,258

(22) Filed: Mar. 16, 2011

(65) Prior Publication Data

US 2011/0309177 A1 Dec. 22, 2011

(30) Foreign Application Priority Data

Jun. 21, 2010 (JP) .................................. 2010-140745

(51) Int. Cl.
*A01K 89/01* (2006.01)

(52) U.S. Cl.
USPC .......................................... 242/259; 242/257

(58) Field of Classification Search
USPC ................... 242/255, 257, 259, 263
See application file for complete search history.

(56) References Cited

U.S. PATENT DOCUMENTS

| 4,867,392 A * | 9/1989 | Sato ............................... 242/255 |
| 5,058,447 A * | 10/1991 | Ikuta ................................ 74/371 |
| 5,297,756 A * | 3/1994 | Ikuta .............................. 242/270 |
| 6,325,315 B1 * | 12/2001 | Chang ............................ 242/255 |
| 6,360,977 B1 * | 3/2002 | Chang ............................ 242/255 |
| 7,234,661 B2 * | 6/2007 | Hirayama et al. ............. 242/303 |
| 7,278,599 B2 * | 10/2007 | Alajajyan et al. .............. 242/303 |
| 7,559,499 B2 * | 7/2009 | Nakagawa et al. ........... 242/246 |

FOREIGN PATENT DOCUMENTS

JP H07-039413 Y2 7/1991

OTHER PUBLICATIONS http://fservice.shimano.co.jp/part/pdf/02030.pdf.

* cited by examiner

*Primary Examiner* — Emmanuel M Marcelo
(74) *Attorney, Agent, or Firm* — Global IP Counselors, LLP

(57) ABSTRACT

A dual-bearing reel speed change operation mechanism is configured for a user to switch transmission speed from rotation of a handle to a spool at either a first speed or a second speed. The dual-bearing speed change operation mechanism includes a handle a handle shaft, an operating shaft, an operating shaft urging member, a base member, a lock member, and a lock member urging member. The handle arm includes a first through hole penetrating therethrough in a direction intersecting with a longitudinal direction of the handle arm, and a first protrusion protruding from the handle arm away from the spool. The base member formed in a plate shape. The base member is configured on a front surface of the handle arm. The base member includes a third through hole communicating with the first through hole, and a fourth through hole in which the first protrusion is inserted.

8 Claims, 6 Drawing Sheets

DUAL-BEARING REEL SPEED CHANGE OPERATION MECHANISM

CROSS-REFERENCE TO RELATED APPLICATIONS

This application claims priority to Japanese Patent Application No. 2010-140745 filed on Jun. 21, 2010. The entire disclosure of Japanese Patent Application No. 2010-140745 is hereby incorporated herein by reference.

BACKGROUND OF THE INVENTION

1. Field of the Invention

The present invention relates to a speed change operation mechanism, and particularly to a dual-bearing reel speed change operation mechanism for switchably transmitting handle rotation to a spool at either a high speed or a low speed.

2. Background Art

Japan Laid-open Patent Application Publication No. H07-039413 (Y2) describes an exemplary dual-bearing reel embedded with a rotation transmission mechanism configured to transmit handle rotation to a spool. The rotation transmission mechanism includes a speed change mechanism configured to switch handle rotation between a high speed and a low speed. In the speed change mechanism, a high speed gear with a large diameter and a low speed gear with a small diameter are attached onto the distal end of a handle shaft. Either of the high speed gear and the low speed gear is selectively allowed to unitarily rotate with the handle shaft. Further, a pinion gear with a small diameter and a pinion gear with a large diameter are attached to a spool shaft and a spool while being unitarily rotatable therewith. The small-diameter pinion gear is allowed to mesh with the large-diameter high speed gear, whereas the large-diameter pinion gear is allowed to mesh with the small-diameter low speed gear. In conjunction with a press operation of an operating shaft, rotation transmission from the handle shaft to the high speed gear is configured to be switched to rotation transmission from the handle shaft to the low speed gear. When the operating shaft is pressed inwards, handle rotation is transmitted to the low speed gear through the handle shaft and is further transmitted to the large-diameter pinion gear through the low speed gear. The spool shaft and the spool hereby rotated at a low speed. On the other hand, handle rotation is transmitted to the high speed gear through the handle shaft and is further transmitted to the small-diameter pinion gear through the high speed gear when the operating shaft is pulled outwards by an operation of moving a lock member, which is movably disposed onto the handle arm, in a direction away from a lock groove formed on the operating shaft. The spool shaft and the spool are thereby rotated at a high speed.

In the speed change operation mechanisms of the aforementioned type, the operating shaft is generally configured to be pulled outwards by an operation of moving the lock member, which is movably disposed onto the handle arm, in a direction away from the lock groove formed on the operating shaft (see e.g., http://fservice.shimano.co.jp/parts/pdf/02030.pdf). The speed change operation mechanisms of the aforementioned type include a base member (retainer), a lock member (lock plate) and a coil spring. The base member is a plate member disposed onto a handle arm. The lock member is a plate member including an operating knob and a locking portion. The operating knob is attached to the tip of the handle arm while being disposed on the base member. An angler pinches and moves the operating knob with his/her fingers. The base end of the lock portion is configured to be locked with a lock groove formed on an operating shaft. The coil spring is held by a protrusion protruding from the base member. Under the condition, the coil spring is configured to urge the lock portion of the lock member towards the lock groove formed on the operating shaft. Further, the base member includes a guide groove thereon for guiding and moving the lock member in a predetermined direction.

SUMMARY

In the aforementioned well-known speed change operation mechanism, the base member includes the protrusion for holding an end of the coil spring and the guide groove for guiding the lock member. The base member is thereby formed in a convexo-concave shape. In other words, the base member can have a complex shape. It is difficult to assemble the base member by a combination of simply shaped members when the base member has a complex shape. Further, the following drawbacks are produced when the base member has a convexo-concave shape. For example, salt is easily deposited on the convexo-concave portion of the base member after evaporation of seawater attached thereto. Further, it is very difficult to remove the deposited salt from the base member by easily disassembling the base member.

In view of the above, the present invention addresses needs to produce a dual-bearing reel speed change operation mechanism including a base member assembled by a combination of simply shaped members. Further, the present invention addresses another need to provide a dual-bearing reel speed change operation mechanism for preventing salt from being easily deposited on a base member and allowing the base member to be easily disassembled for removing the deposited salt.

A dual-bearing reel speed change operation mechanism in provided for a user to switch transmission speed from rotation of a handle to a spool at either a first speed or a second speed. The second speed is lower than the first speed. The dual-bearing reel speed change operation mechanism includes a handle, a handle shaft, an operating shaft, an operating shaft urging member, a base member, a lock member, and a lock member urging member. The handle includes a handle arm and a handle knob. The handle arm includes a first through hole penetrating therethrough in a direction intersecting with a longitudinal direction of the handle arm, and a first protrusion protruding from a front surface of the handle arm away from the spool. The handle knob is attached to a distal end of the handle arm. The front surface of the handle facing the handle knob. The handle shaft includes a base end being inserted in the first through hole, and a second through hole penetrating in an axial direction of handle shaft. The operating shaft includes a shaft portion being inserted in the second through hole, where the shaft portion including an engaged portion on an outer periphery of a base end thereof. The operating shaft also includes a press operating portion being configured adjacent to the base end of the shaft portion for the user to switch the transmission speed of the rotation of the handle between the first speed to the second speed by pressing the press operating portion. The press operation portion has a larger diameter than a diameter of the shaft portion. The operating shaft urges member configured to urge the operating shaft axially to the handle. The base member is formed in a plate shape. The base member is configured on the front surface of the handle arm, and includes a third through hole, and a fourth through hole. The third through hole communicates with the first through hole. In fourth through hole, the first protrusion is inserted. The lock member is movably disposed on a front surface of the base member. The front surface of the base member faces the handle knob. The lock member includes an engaging portion, a fifth through hole, a holding portion, and a moving operating portion. The engaging portion is configured to be engaged with the engaged portion of the shaft portion. The fifth through hole is elongated in a longitudinal direction of the lock portion. The first protrusion is inserted in the fifth through hole. The fifth through hole is configured to restrict movement of the lock member by abutting the first protrusion. The holding portion is formed on a longitudinal end of the fifth through hole. The moving operating portion is configured to be operated for allowing the engaging portion to be engaged with or disengaged from the engaged portion. The lock member urging member is configured to urge the lock member in a direction to allow the engaging portion being engaged with the engaged portion. The lock member urging member is attached in the fifth through hole of the lock member to allow one of axial ends thereof being held by the first protrusion and to allow the other of the axial ends thereof being held by the holding portion.

BRIEF DESCRIPTION OF THE DRAWINGS

Referring now to the attached drawings which form a part of this original disclosure.

DETAILED DESCRIPTION OF THE EMBODIMENTS

Figure 1:
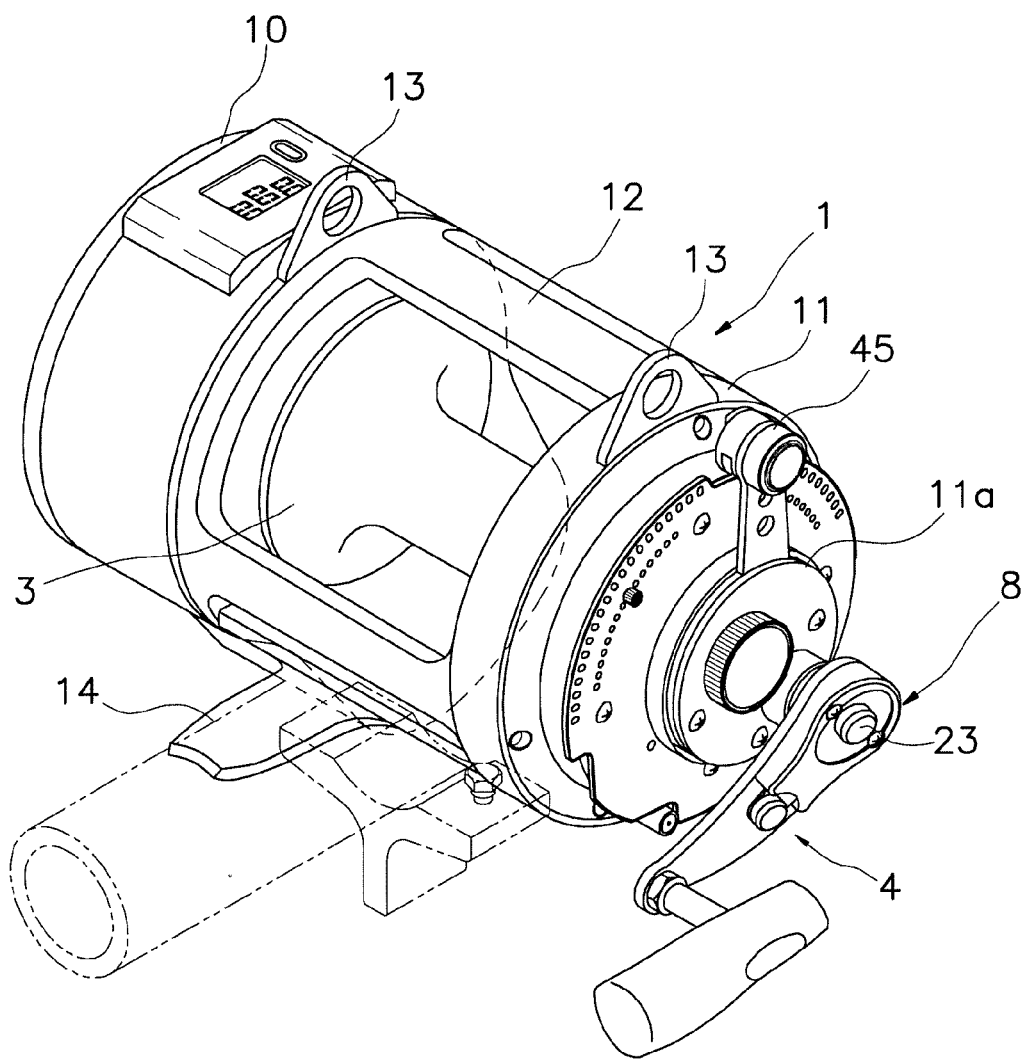
FIG. 1 is a perspective view of a fishing reel adopting an exemplary embodiment of the present invention.
Figure 2:
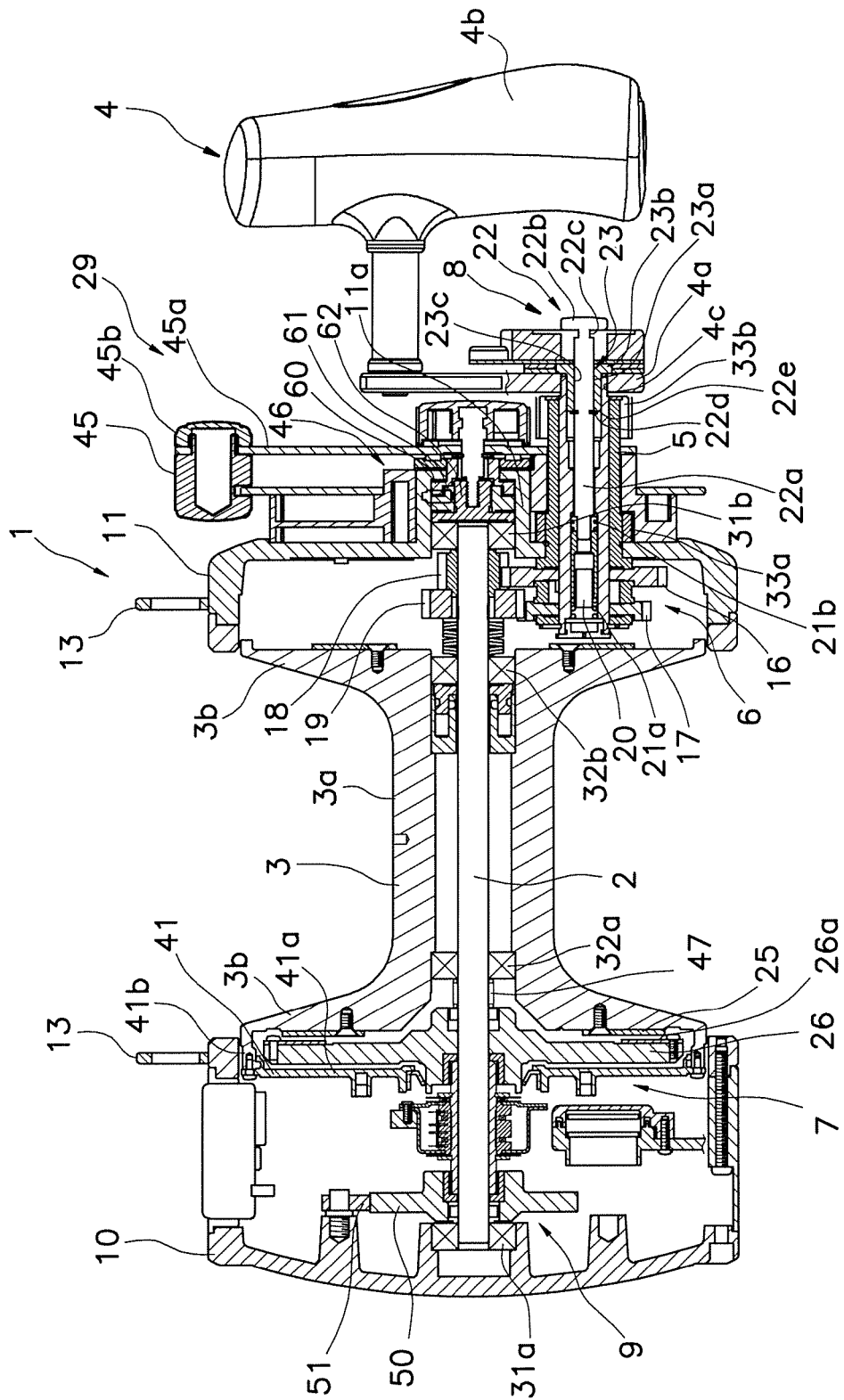
FIG. 2 is a cross-sectional view of the fishing reel.

As illustrated in FIGS. 1 and 2, a dual-bearing reel adopting an exemplary embodiment of the present invention is a large dual-bearing reel to be used for trolling. The dual-bearing reel includes a tubular reel unit 1, a spool shaft 2, a spool 3 and a handle 4. The spool shaft 2 is rotatably attached to the center part of the reel unit 1. The spool 3 is supported by the spool shaft 2 while being allowed to rotate but prevented from axially moving. The handle 4 is disposed lateral to the reel unit 1. Further, the dual-bearing reel includes a rotation transmission mechanism 6, a lever drag mechanism 7 and an anti-reverse mechanism 9 in the inside of the reel unit 1. The rotation transmission mechanism 6 is configured to transmit rotation of the handle 4 to the spool 3. The lever drag mechanism 7 is configured to brake the rotation of the spool 3 in a fishing line release direction. The anti-reverse mechanism 9 is configured to prevent the spool 3 from rotating in the fishing line release direction.

The reel unit 1 includes a first side plate 10 (left side plate) and a second side plate 11 (right side plate), and a reel body 12. The first and second side plates 10 and 11 are closed-end tubular members made of metal. The reel body 12 is a perforated tubular member made of metal. The first and second side plates 10 and 11 are concentrically joined to the both axial ends of the reel body 12 by a socket joint. Under the condition, the first and second side plates 10 are fixed to the reel body 12 by a plurality of fixation screws. The first and second side plates 10 and 11 support the both axial ends of the spool shaft 2 with roughly the center parts thereof for allowing the spool shaft 2 to rotate.

A pair of harness lugs 13 is attached to the top of the reel unit 1 at a predetermined interval for connecting the dual-bearing reel to a single or plurality of reel harnesses. Specifically, one of the harness lugs 13 is disposed between the first side plate 10 and the reel body 12, whereas the other of the harness lugs 13 is disposed between the second side plate 11 and the reel body 12. On the other hand, a fishing rod attachment portion 14 is disposed on the bottom of the reel body 12 for attaching the dual-bearing reel to a fishing rod.

As illustrated in FIG. 2, the spool shaft 2 is rotatably supported by the first and second side plates 10 and 11 through a bearing 31a (left side bearing) and a bearing 31b (right side bearing) disposed onto the both axial ends of the spool shaft 2. Further, the spool 3 is rotatably supported by two bearings 32a and 32b disposed onto the spool shaft 2. The bearings 32a and 32b are separate from each other while being disposed between the bearings 31a and 31b in the axial direction. Specifically, the bearings 32a and 32b are disposed in the both axial ends of the spool 3. As illustrated in FIG. 2, a ratchet wheel 50 (to be described) of the anti-reverse mechanism 9 is abutted to the right side of an inner race of the bearing 31a disposed onto the left axial end of the spool shaft 2. On the other hand, a friction disc 26 (to be described) of the lever drag mechanism 7 is abutted to the left side of an inner race of the left-side bearing 32a supporting the spool 3.

As illustrated in FIG. 2, the spool 3 includes a bobbin trunk 3a and a pair of flanges 3b integrally formed with the axial ends of the bobbin trunk 3a.

As illustrated in FIG. 2, the handle 4 is fixed onto a protruded end of a tubular handle shaft 5 disposed in parallel to and below the spool shaft 2. The handle shaft 5 is rotatably supported by the reel unit 1 through two bearings 33a and 33b. The bearings 33a and 33b are disposed below a boss 11a while being axially separated from each other.

Figure 3:
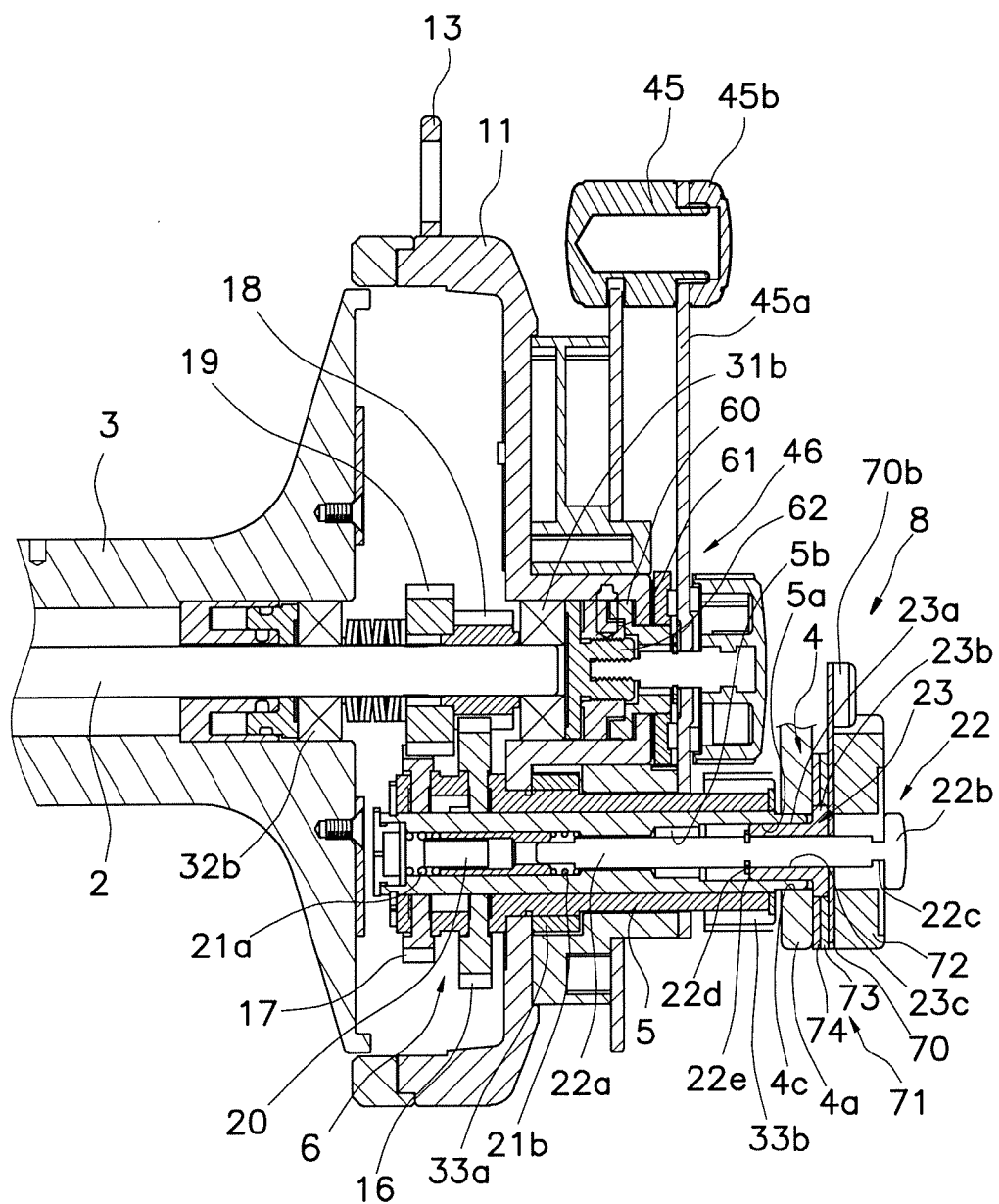
FIG. 3 is an enlarged cross-sectional view of the right part of the fishing reel.

As illustrated in FIGS. 2 and 3, the rotation transmission mechanism 6 includes a speed change operation mechanism 8 configured to switch handle rotation speed between a high speed (first speed) and a low speed (second speed).

As illustrated in FIGS. 2 and 3, the speed change operation mechanism 8 includes a first main gear 16, a second main gear 17, a first pinion gear 18, a second pinion gear 19, an engaging piece 20, a first compression spring 21a, a second compression spring 21b and an operating shaft 22. The first main gear 16 is used for winding a fishing line at a high speed, whereas the second main gear 17 is used for winding the fishing line at a low speed. The first and second main gears 16 and 17 are both rotatably supported onto the handle shaft 5 of the handle 4. The first pinion gear 18 is meshed with the first main gear 16, whereas the second pinion gear 19 is meshed with the second main gear 17. Under the condition, the first and second pinion gears 18 and 19 are rotatably supported onto the spool shaft 2. The engaging piece 20 is configured to couple the handle shaft 5 to either the first main gear 16 or the second main gear 17 and transmit rotation therefrom to a coupled one of the first and second pinion gears 16 and 17. The first compression spring 21a is disposed on the left side of the engaging piece 20 in FIG. 2 for urging the operating shaft 22 axially outwards (rightwards in FIG. 2) through the engaging piece 20 and the second compression spring 21b to be described. The second compression spring 21b is disposed on the right side of the engaging piece 20 in FIG. 2 for urging the engaging piece 20 towards the second main gear 17. The operating shaft 22 is configured to set the engaging piece 20 to be in either a high speed position or a low speed position. In the high speed position, the engaging piece 20 is engaged with the first main gear 16. The engaging piece 20, which is set in the high speed position, is depicted with a solid line in FIG. 2. In the low speed position, on the other hand, the engaging piece 20 is engaged with the second main gear 17.

As illustrated in FIG. 2, the first pinion gear 18 is a tubular member made of metal having a corrosion resistance property (e.g., non-magnetic stainless alloy). The second pinion gear 19 is a tubular member made of material similar to that of the first pinion gear 18. The engaging piece 20 is non-rotatably disposed within a slit of the handle shaft 5. As illustrated in FIG. 2, the operating shaft 22 is inserted into a through hole 5$b$ (an example of a second through hole) of the handle shaft 5. In FIG. 2, the axially right end of the operating shaft 22 is protruding axially outwards (rightwards in FIG. 2) from a handle arm 4$a$. Therefore, the operating shaft 22 is allowed to be pushed leftwards in FIG. 2. The operating shaft 22 is supported by a nut member 23 in an axially movable state. The nut member 23 is provided for fixing the handle 4 to the handle shaft 5 under the condition that the handle 4 is screwed onto the protruded end of the handle shaft 5.

As illustrated in FIGS. 2 to 5, the speed change operation mechanism 8 includes the handle 4, the handle shaft 5 including the nut member 23, the first compression spring 21$a$, the operating shaft 22, a lock member 70, a spring member 75 (an example of a lock member urging member), a base member 71 and a case member 72.

As illustrated in FIGS. 2 to 5, the handle 4 includes the handle arm 4$a$ and a handle knob 4$b$. The handle arm 4$a$ includes a through hole 4$c$ (an example of a first through hole) formed in a direction intersecting with the longitudinal direction thereof. The handle knob 4$b$ is rotatably attached to the distal end of the handle arm 4$a$. The handle arm 4$a$ is a metal plate member including the through hole 4$c$ non-circularly formed in the base end thereof. The nut member 23, which forms a part of the handle shaft 5, is fitted in the through hole 4$c$ while being unitarily rotatable with the handle arm 4$a$. As illustrated in FIG. 2, the handle shaft 5 includes a female threaded portion 5$a$ on the inner periphery of the base end portion of the through hole 5$b$. A male threaded portion 23$a$ of the nut member 23 is screwed into the female threaded portion 5$a$. Accordingly, the handle shaft 5 and the nut member 23 are unitarily rotatable. The nut member 23 includes a head portion 23$b$ with a hexagonal shape. The head portion 23$b$ is engaged with a through hole 71$a$ (an example of a third through hole) while being prevented from rotating with respect thereto. The through hole 71$a$ is a non-circular hole formed in the base member 71 attached to the handle arm 4$a$ to be described. The nut member 23 includes a through hole 23$c$ in the center part thereof. A shaft portion 22$a$ of the operating shaft 22 to be described is movably inserted through the through hole 23$c$. Further, the handle arm 4$a$ includes two female threaded holes 4$f$ on the surface thereof. Specifically, the female threaded holes 4$f$ are disposed about the through hole 4$c$. The female threaded holes 4$f$ are used for fixing the base member 71 and the case member 72 (both of which are to be specifically described) to the handle arm 4$a$ by two screw members. Further, the handle arm 4$a$ includes a first protrusion 4$d$ and a second protrusion 4$e$, both of which are protruding from the surface thereof. Specifically, the first and second protrusions 4$d$ and 4$e$ are respectively disposed on the base-end and the front-end positions across the through hole 4$c$. The first protrusion 4$d$ is a roughly columnar portion allowed to be inserted through a through hole 71$b$ (an example of a fourth through hole) formed in the base member 71 and a through hole 70$d$ (an example of a fifth through hole) formed in the lock member 70 to be specifically described.

The second protrusion 4$e$ is a roughly columnar portion allowed to be inserted through a through hole 71$d$ (an example of an eighth through hole) formed in the base member 71 and a through hole 70$f$ (an example of a ninth through hole) formed in the lock member 70.

As illustrated in FIGS. 2 and 3, the operating shaft 22 is a bolt-like shaft member to be inserted through the through hole 4$c$ of the handle arm 4$a$. The operating shaft 22 includes the shaft portion 22$a$ and a press operating portion 22$b$ having a diameter greater than that of the shaft portion 22$a$. As illustrated in FIG. 2, the shaft portion 22$a$ is disposed under the condition that the left distal end thereof presses the engaging piece 20 towards the second main gear 17 through the second compression spring 21$b$. Further, the shaft portion 22$a$ includes an engaged portion 22$c$ on the outer periphery of the base end (i.e., right end) thereof. The engaged portion 22$c$ is an engagement groove formed on the outer periphery of the shaft portion 22$a$. An engaging portion 70$c$, which is a curved portion of the lock member 70 to be specifically described, is allowed to be engaged with the engaged portion 22$c$. As illustrated in FIGS. 2 and 3, the shaft portion 22$a$ includes an annular groove 22$d$ on the outer periphery of the axial center thereof. Further, two E-shaped retainer rings 22$e$ are attached to the annular groove 22$d$ for preventing the operating shaft 22 from being ejected from the handle shaft 5 to the outside of the handle arm 4$a$. The press operating portion 22$b$ is a large-diameter circular press operation button formed in the axial base end (right end in FIG. 2) of the shaft portion 22$a$ for allowing an angler to perform a press operation of switching handle rotation between a high speed and a low speed.

Figure 4:
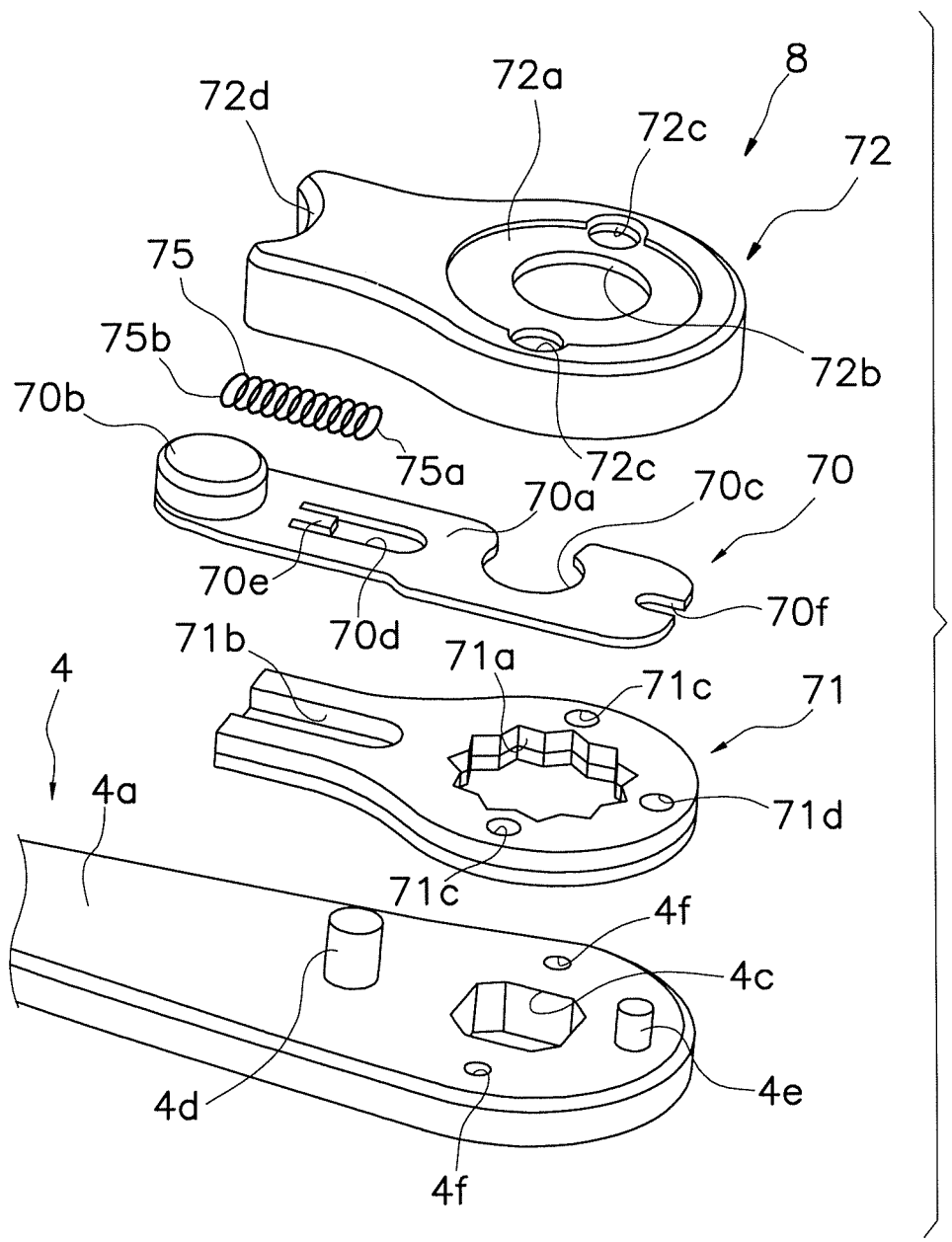
FIG. 4 is an exploded perspective view of a speed change operation mechanism of the fishing reel.
Figure 5:
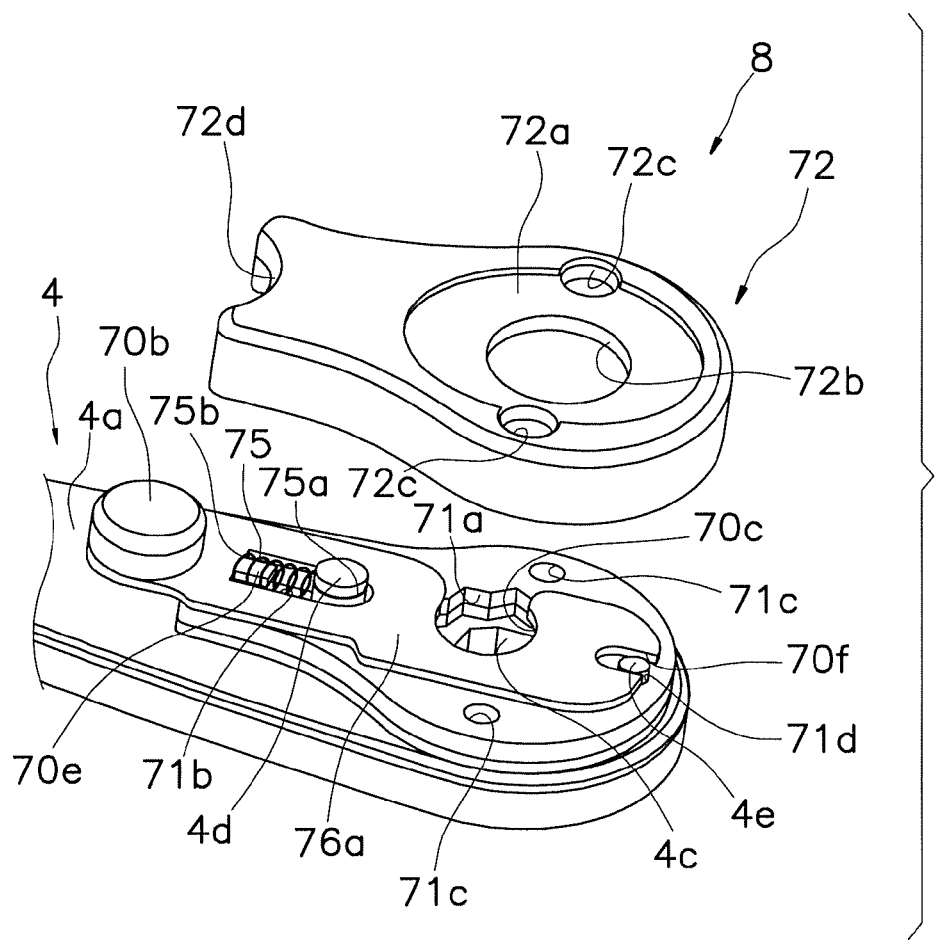
FIG. 5 is an exploded perspective view of the speed change operation mechanism of a partially assembled state.

As illustrated in FIGS. 2 to 5, the lock member 70 includes a main body 70$a$ and a moving operating portion 70$b$. The main body 70$a$ is a plate member movably disposed on the surface of the base member 71 along the longitudinal direction of the base member 71. The moving operating portion 70$b$ is disposed on a distal end of the main body 70$a$. As illustrated in FIGS. 4 and 5, the lock member 70 further includes the engaging portion 70$c$, the through hole 70$d$, a holding portion 70$e$ and the through hole 70$f$. The engaging portion 70$c$ is allowed to be engaged with the engaged portion 22$c$ formed on the shaft portion 22$a$ of the operating shaft 22. The through hole 70$d$ is elongated in the longitudinal direction of the lock member 70. The first protrusion 4$d$ of the handle arm 4$a$ is allowed to be inserted through the through hole 70$d$ while being abutted to the front end (i.e., the right end in FIG. 4) of the through hole 70$d$ for restricting movement of the lock member 70. The holding portion 70$e$ is formed in the base end (i.e., the left end in FIG. 4) of the through hole 70$d$. The through hole 70$f$ is elongated in the longitudinal direction of the lock member 70. The second protrusion 4$e$ of the handle arm 4$a$ is allowed to be inserted through the through hole 70$f$ while being abutted to the base end (i.e., the left end in FIG. 4) of the through hole 70$f$ for restricting movement of the lock member 70.

As illustrated in FIGS. 4 and 5, the main body 70$a$ is a plate member. As illustrated in FIGS. 4 and 5, the moving operating portion 70$b$ is a knob member having a roughly circular shape. The shape allows an angler to easily pinch the moving operation portion 70$b$ with his/her fingers. In other words, an angler can easily perform a moving operation of the moving operating portion 70$b$. As illustrated in FIG. 4, the moving operating portion 70$b$ is movably disposed along the longitudinal direction of the handle arm 4$a$. The main body 70$a$ includes the engaging portion 70$c$ on the front-end lateral part thereof for allowing the engaging portion 70$c$ to be engaged with the engaged portion 22$c$. The engaging portion 70$c$ is a roughly circular through hole laterally opened to be engaged with the engaged portion 22c. The main body 70a includes the through hole 70d longitudinally between the moving operating portion 70b and the engaging portion 70c for allowing the first protrusion 4d of the handle arm 4a to be inserted therethrough. The through hole 70d is elongated in the longitudinal direction of the main body 70a. The through hole 70d is abutted to the front side of the first protrusion 4d for restricting the lock member 70 from moving towards the base-end side (i.e., the left side in FIG. 4). Further, the spring member 75 is attached to the through hole 70d. The through hole 70d has a transverse width slightly greater than the outer diameter of the first protrusion 4d of the handle arm 4a. The through hole 70d includes the holding portion 70e in the base end thereof. The holding portion 70e is a rod-like portion protruding towards the front end of the through hole 70d. The base end of the spring member 75 is attached onto the holding portion 70e. Further, the main body 70a includes the through hole 70f on the front end thereof. The through hole 70f is opened to the front-end side for allowing the second protrusion 4e of the handle arm 4a to be inserted therethrough. The through hole 70f is elongated in the longitudinal direction of the main body 70a. The through hole 70f is abutted to the base-end side of the second protrusion 4e of the handle arm 4a for restricting the lock member 70 from moving towards the front-end side (i.e., the right side in FIG. 4). The through hole 70f has a transverse width slightly greater than the outer diameter of the second protrusion 4e of the handle arm 4a.

As illustrated in FIGS. 4 and 5, the spring member 75 is a coil spring for urging the lock member 70 towards the operating shaft 22. The spring member 75 is disposed within the through hole 70d in a compressed state. Specifically, a first end 75a (i.e., front end) of the spring member 75 is abutted to the first protrusion 4d of the handle arm 4a, whereas a second end 75b (i.e., base end) of the spring member 75 is held by the holding portion 70e.

As illustrated in FIGS. 2 to 5, the base member 71 is a plate member produced by press working and is disposed on the surface of the handle arm 4a along the longitudinal direction of the handle arm 4a. As illustrated in FIGS. 4 and 5, the base member 71 includes the through hole 71a, the through hole 71b, two screw holes 71c and the through hole 71d. The through hole 71a is a non-circular hole communicating with the through hole 4c of the handle arm 4a. The head portion 23b of the nut member 23 is engaged with the through hole 71a. The through hole 71b is elongated in the longitudinal direction of the base member 71 for allowing the first protrusion 4d of the handle arm 4a to be inserted therethrough and allowing the spring member 75 to be attached to the inside thereof. The two screw holes 71c are disposed about the through hole 71a for fixing the base member 71 to the handle arm 4a using two screw members penetrating therethrough. The through hole 71d is disposed closer to the front-end of the base member 71 than the through hole 71a is for allowing the second protrusion 4e of the handle arm 4a to be inserted therethrough. The base member 71 is a base for allowing both the main body 70a of the lock member 70 and the spring member 75 to be movably disposed on the front surface thereof. Further, the base member 71 includes the non-circular through hole 71a to be engaged with the head portion 23b of the nut member 23. Therefore, the base member 71 functions as a retainer. The through hole 71a has a polygonal inner shape for allowing the head portion 23b having a hexagonal shape to be engaged therewith at any positions. The through hole 71b is elongated in the longitudinal direction of the base member 71 for communicating with the through hole 70d of the lock member 70 and allowing the spring member 75 to be attached therein. The base member 71, together with the case member 72, is fixed to the front surface of the handle arm 4a by two screw members. The screw members are herein inserted through the two screw holes 71c. The through hole 71b is an elongated hole for allowing the first protrusion 4d of the handle arm 4a to be inserted therethrough and allowing the spring member 75 to be attached to the inside thereof.

Figure 6:
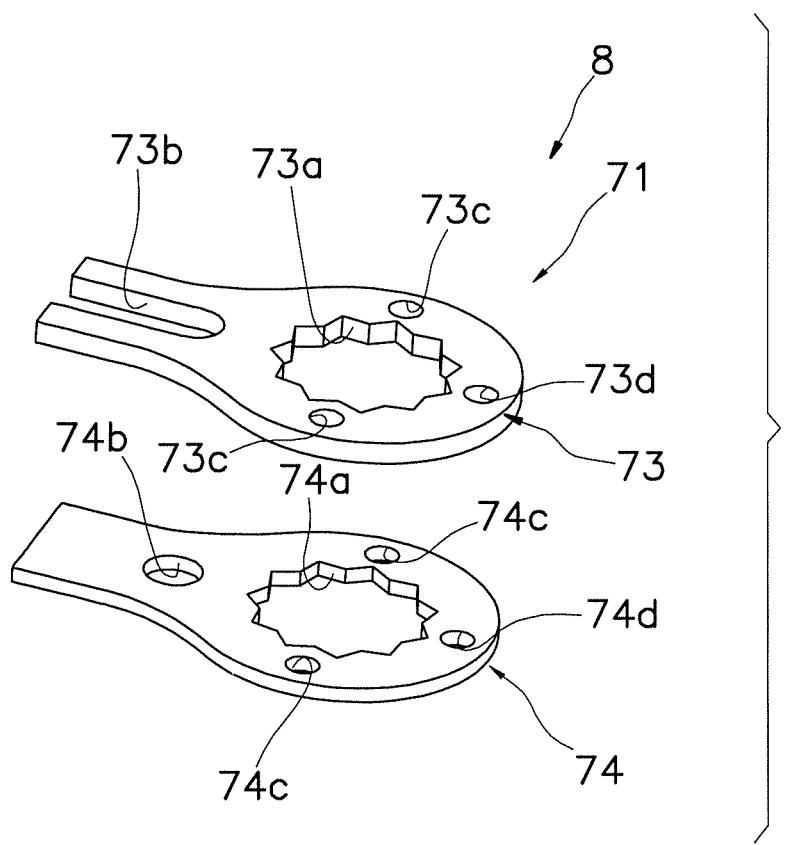
FIG. 6 is an exploded perspective view of a base member of the speed change operation mechanism.

As illustrated in FIG. 6, the base member 71 is structured by two members having through holes of different shapes, i.e., a first base member 73 and a second base member 74. The first and second base members 73 and 74 are separately produced by press working and are fitted to each other as a single member by adhesion or the like.

As illustrated in FIG. 6, the first base member 73 includes a through hole 73a, a through hole 73b (an example of a sixth through hole), two screw holes 73c and a through hole 73d. The through hole 73a is a non-circular hole communicating with the through hole 4c of the handle arm 4 for allowing the head portion 23b of the nut member 23 to be engaged therewith. The through hole 73b is an elongated hole for allowing the first protrusion 4d of the handle arm 4a to be inserted therethrough and allowing the spring member 75 to be attached therein. The screw holes 73c allow two screw members to be inserted therethrough for fixing the base member 71 to the handle arm 4a. The through hole 73d allows the second protrusion 4e of the handle arm 4a to be inserted therethrough.

As illustrated in FIG. 6, the second base member 74 includes a through hole 74a, a through hole 74b (an example of a seventh through hole), two screw holes 74c and a through hole 74d. The through hole 74a is a non-circular hole communicating with the through hole 4c of the handle arm 4a for allowing the head portion 23b of the nut member 23 to be engaged therewith. The through hole 74b is a roughly circular through hole for allowing the first protrusion 4d of the handle arm 4a to be inserted therethrough. The screw holes 74c allow two screw members to be inserted therethrough for fixing the base member 71 to the handle arm 4a. The through hole 74d allows the second protrusion 4e of the handle arm 4a to be inserted therethrough. When the first and second base members 73 and 74 are herein closely fitted to each other, the outer shapes of the first and second base members 73 and 74 are perfectly matched. Similarly, the outer shapes of the through holes 73a and 74a are perfectly matched. Further, the outer shapes of the two screw holes 73c and the two screw holes 74c are perfectly matched. Yet further, the outer shapes of the through holes 73d and 74d are perfectly matched. The through hole 74b is shaped for communicating with the front end (i.e., the right end in FIG. 6) of the through hole 73b. The first protrusion 4d of the handle arm 4a is thereby allowed to be inserted through the through hole 74d and the front end of the through hole 73b.

As illustrated in FIGS. 2 to 5, the case member 72 is a cover member fixed to the surface of the handle arm 4a and covers the operating shaft 22, the lock member 70, the spring member 75 and the base member 71 for allowing the press operating portion 22b of the operating shaft 22 and the moving operating portion 70b of the lock member 70 to be exposed to the outside. As illustrated in FIGS. 4 and 5, the case member 72 include a through hole 72b, two screw holes 72c and a lateral hole 72d. The through hole 72b is a roughly circular through hole for exposing the press operating portion 22b to the outside. The screw holes 72c allow two screw members to be inserted therethrough for fixing the case member 72, together with the base member 71, to the handle arm 4a. The lateral hole 72d is a rectangular hole for exposing the moving operating portion 70b on the laterally outside of the case member 72. Further a recess 72a is formed about the roughly circular through hole 72b. Specifically, the recess 72a is formed by partially recessing the surface of the case member 72 while partially overlapping with the two screw holes 72c.

When the operating shaft 22 is pressed leftwards by a press operation of the press operating portion 22b thereof in FIG. 2, the engaging portion 70c of the aforementioned lock member 70 is engaged with the engaged portion 22c of the operating shaft 22. The operating shaft 22 is thereby set to be in a locked state. When the moving operating portion 70b of the lock member 70 is operated to be moved in a pressing direction, the engaging portion 70c of the lock member 70 is separated away from the engaged portion 22c of the operating shaft 22. The operating shaft 22 is thereby set to be in an unlocked state.

In the speed change operation mechanism 8 with the aforementioned structure, the engaging piece 20 is configured in the second main gear 17 when the operating shaft 22 is pressed leftwards in FIG. 2 by a press operation of the press operating portion 22b of thereof. Accordingly, the rotation of the handle 4 is transmitted to the second pinion gear 19 through the second main gear 17. The spool 3 is thereby rotated at a low speed. On the other hand, the engaging piece 20 is configured in the first main gear 16 when the operating shaft 22 is pulled rightwards in FIG. 2 by urging force through an operation of moving the moving operating portion 70b of the lock member 70 in the pressing direction for unlocking the engaging portion 70c (i.e., the curved portion) of the lock member 70 from the engaged portion 22c (i.e., the annular groove) formed on the shaft portion 22a of the operating shaft 22 in a direction away from the engaged portion 22c. Accordingly, the rotation of the handle 4 is transmitted to the first pinion gear 18 through the first main gear 16. The spool 3 is thereby rotated at a high speed.

As illustrated in FIG. 2, the lever drag mechanism 7 includes a brake disc 25, the friction disc 26, and a moving mechanism 29. The brake disc 25 is attached to the left side of the spool 3. The friction disc 26 is disposed on the left side of the brake disc 25 while being opposed thereto. The moving mechanism 29 is configured to reciprocate the spool 3 and the brake disc 25 in the axial direction of the spool shaft 2.

As illustrated in FIG. 2, the brake disc 25 is a washer-like disc member made of for instance, stainless. The brake disc 25 is attached to the end surface of the left-side flange 3b of the spool 3 by a plurality of attachment pins disposed at predetermined intervals along the circumferential direction thereof. The brake disc 25 is prevented from rotating with respect to the spool 3 but is allowed to move at a predetermined distance in the axial direction of the spool 3 for making contact with or separating away from the spool 3.

As illustrated in FIG. 2, the friction disc 26 is opposed to the brake disc 25. The friction disc 26 is attached onto the spool shaft 2 while being movable in the axial direction of the spool shaft 2. A friction plate 26a is fixed to the friction disc 26 surface opposed to the brake disc 25 by screws. For example, the friction plate 26a is a ring plate made of abrasion resistant material such as carbon graphite, fiber reinforced resin, or the like. The right end surface of the inner periphery of the friction disc 26 is abutted to the inner race of the bearing 32a disposed in the inner periphery of the spool 3 through a coil spring 47 of the moving mechanism 29. On the other hand, the left end surface of the inner periphery of the friction disc 26 is indirectly abutted to the ratchet wheel 50 of the anti-reverse mechanism 9. The ratchet wheel 50 is non-rotatably attached to the outer peripheral surface of the spool shaft 2. The ratchet wheel 50 is abutted to the inner race of the bearing 31a. The outer race of the bearing 31a is abutted to the first side plate 10. The friction disc 26 is thereby prevented from moving outwards in the axial direction of the spool shaft 2 (i.e., leftwards in FIG. 2). Further, the fiction disc 26 is prevented from rotating in the fishing line release direction by the ratchet wheel 50. The anti-reverse mechanism 9 is a claw type mechanism and includes the ratchet wheel 50 and a ratchet claw 51. The ratchet wheel 50 includes saw teeth on the outer periphery thereof. The ratchet claw 51 is disposed on the outer peripheral side of the ratchet wheel 50 for locking the saw teeth with the tip thereof. The ratchet claw 51 is pivotably attached to the inner surface of the first side plate 10. The ratchet claw 51 is urged for locking the saw teeth by a tension spring.

As illustrated in FIG. 2, the outside of the friction disc 26 is covered with a drag cover 41. The drag cover 41 is made of, for instance, aluminum alloy for achieving good heat radiation. The drag cover 41 includes a cover body 41a and an attachment portion 41b. The cover body 41a is a saucer-like member having a circular opening in the center thereof. The attachment portion 41b is a ring member integrally formed with the outer peripheral surface of the cover body 41a. The cover body 41a includes a space in the inside thereof for containing the friction disc 26 and the brake disc 25. The attachment portion 41b is fixed to the end surface of the flange 3b of the spool 3 by arbitrary fixation means such as a plurality of screws. The drag cover 41 is configured to unitarily rotate with the spool 3.

As illustrated in FIG. 2, the moving mechanism 29 includes a brake operating lever 45, a press mechanism 46, and the coil spring 47. The brake operating lever 45 is pivotably disposed in the reel unit 1. The press mechanism 46 is configured to press and move the spool 3 and the brake disc 25 leftwards in FIG. 2 in conjunction with a clockwise pivot of the brake operating lever 45. The coil spring 47 is configured to urge the friction disc 26 for moving the spool 3 and the brake disc 25 rightwards in FIG. 2 in conjunction with a counterclockwise pivot of the brake operating lever 45. The coil spring 47 is attached onto the outer periphery of the spool shaft 2 in a compressed state while being interposed between the friction disc 26 and the bearing 32a disposed in the inner periphery of the spool 3. The coil spring 47 is configured to urge the friction disc 26 and the spool 3 in opposite directions.

As illustrated in FIG. 2, the brake operating lever 45 is attached to the reel unit 1 while being pivotable between a brake release position and a maximum brake position. When pivoted in the clockwise direction, the brake operating lever 45 is set to be in the brake release position. When pivoted in the counterclockwise direction, on the other hand, the brake operating lever 45 is set to be in the maximum brake position. The brake operating lever 45 includes a lever portion 45a and a knob portion 45b. The lever portion 45a is pivotably attached onto the boss 11a. The knob portion 45b is fixed to the front end of the lever portion 45a. The base end of the lever portion 45a is non-rotatably held by a first cam member 60 forming a part of the press mechanism 46.

The press mechanism 46 includes the first cam member 60, a second cam member 61 and a press member 62. The first cam member 60 is attached to the inner peripheral surface of the boss 11a while being rotatable but axially non-movable. The second cam member 61 is configured to axially move in conjunction with rotation of the first cam member 60. The press member 62 is configured to axially move in conjunction with the second cam member 61. The first cam member 60 is a two-tier (large and small tier) tubular member configured to rotate in conjunction with pivot of the brake operating lever 45. Further, the first cam member 60 includes a tilt cam on the base-end surface of the large-diameter portion thereof. The second cam member 61 is a tubular member. The second cam member is attached to the inner peripheral surface of the boss 11a while being non-rotatable but axially movable. The second cam member 61 includes a tilt cam on the outer peripheral side end surface thereof opposed to the first cam member 60. The tilt cam of the second cam member 61 is configured to be engaged with the tilt cam of the first cam member 60. When the above two tilt cams are relatively rotated, rotary movement of the first cam member 60 is converted into axial linear movement of the second cam member 61. The second cam member 61 is thereby axially moved. The inner peripheral surface of the second cam member 61 is screwed onto the press member 62. The relative axial positional relation can be thereby adjusted between the second cam member 61 and the press member 62. In other words, drag force can be adjusted depending on the position of the brake operating lever 45.

According to the aforementioned dual-bearing reel speed change operation mechanism 8, the base member 71 includes the through hole 71b allowing the first protrusion 4d of the handle arm 4a to be inserted therethrough, whereas the lock member 70 includes the through hole 71d elongated in the longitudinal direction thereof for allowing the first protrusion 4d of the handle arm 4a to be inserted therethrough and restricting movement of the lock member 70 by abutting the front-end side of the first protrusion 4d. The handle arm 4a herein includes the first protrusion 4d, whereas the lock member 70 includes the through hole 70d for restricting movement of the lock member 70. Therefore, the base member 71 is not required to have a guide groove for guiding the protrusion and the lock member 70 unlike the well-known base member structure. Further, the base member 71 can be herein formed in a plate shape. Therefore, the base member 71 can be structured by a combination of simply shaped members, i.e., the first base member 73 and the second base member 74. Yet further, the base member 71 can be formed without any convexo-concave portion due to the aforementioned advantage that the base member 71 is not required to have a guide groove for guiding the protrusion and the lock member 70 unlike the well-known base member structure. Therefore, it is possible to prevent salts from being easily deposited on the base member 71. Even when salts are actually deposited on the base member 71, the deposited salts can be removed by easily disassembling the base member 71.

Other Exemplary Embodiments (a) The aforementioned exemplary embodiment exemplifies a middle size lever drag reel. However, the application of the present invention is not limited to the above. For example, any suitable dual-bearing reels can adopt the present invention as long as they are the dual-bearing reels embedded with the speed change operation mechanism.

(b) In the aforementioned exemplary embodiment, the base member 71 is structured by two members, i.e., the first base member 73 and the second base member 74. However, the structure of the base member 71 is not necessarily limited to the above. For example, the base member 71 can be made by a single member.

(c) In the aforementioned exemplary embodiment, the base member 71 is produced by press working. However, the base member 71 can be processed by other manufacturing methods.

(d) In the aforementioned exemplary embodiment, the first main gear 16 with a large diameter is disposed in an axial outward position on the handle shaft 5 for winding the fishing line at a high speed, whereas the second main gear 17 with a small diameter is disposed in an axial inward position on the handle shaft 5 for winding the fishing line at a low speed. With the structure, handle rotation can be switched from a high speed to a low speed in conjunction with a press operation of the press operating portion 22b of the operating shaft 22. However, the second main gear with a small diameter can be disposed in an axial outward position on the handle shaft 5 for winding the fishing line at a low speed, whereas the first main gear with a large diameter can be disposed in an axial inward position on the handle shaft 5 for winding the fishing line at a high speed. Accordingly, handle speed can be switched from a low speed to a high speed in conjunction with a press operation of the press operating portion 22b of the operating shaft 22.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel speed change operation mechanism configured for a user to switch transmission speed from rotation of a handle to a spool at either a first speed or a second speed being lower than the first speed, the dual-bearing reel speed change operation mechanism comprising:
   a handle including
      a handle arm including a first through hole penetrating therethrough in a direction intersecting with a longitudinal direction of the handle arm, and a first protrusion protruding from a front surface of the handle arm away from the spool, and
      a handle knob attached to a distal end of the handle arm, the front surface of the handle facing the handle knob;
   a handle shaft including a base end being inserted in the first through hole, the handle shaft including a second through hole penetrating in an axial direction of handle shaft;
   an operating shaft including
      a shaft portion being inserted in the second through hole, the shaft portion including an engaged portion on an outer periphery of a base end thereof, and
      a press operating portion being configured adjacent to the base end of the shaft portion for the user to switch the transmission speed of the rotation of the handle between the first speed to the second speed by pressing the press operating portion, the press operation portion having a larger diameter than a diameter of the shaft portion;

an operating shaft urging member configured to urge the operating shaft axially to the handle;

a base member formed in a plate shape, the base member configured on the front surface of the handle arm, the base member including
- a third through hole communicating with the first through hole, and
- a fourth through hole in which the first protrusion is inserted;

a lock member movably disposed on a front surface of the base member, the front surface of the base member facing the handle knob, the lock member including
- an engaging portion configured to be engaged with the engaged portion of the shaft portion;
- a fifth through hole being elongated in a longitudinal direction of the lock portion, the first protrusion being inserted in the fifth through hole, the fifth through hole being configured to restrict movement of the lock member by the first protrusion abutting an inner wall which defines the fifth through hole;
- a holding portion formed on a longitudinal end of the fifth through hole, and
- a moving operating portion configured to be operated for allowing the engaging portion to be engaged with or disengaged from the engaged portion; and a lock member urging member configured to urge the lock member in a direction to allow the engaging portion being engaged with the engaged portion, the lock member urging member attached in the fifth through hole of the lock member to allow one of axial ends thereof being held by the first protrusion and to allow the other of the axial ends thereof being held by the holding portion.

2. The dual-bearing reel speed change operation mechanism according to claim 1, wherein
the fourth through hole is elongated in a longitudinal direction of the base member to communicate with the fifth through hole and to allow the lock member urging member being attached therein.

3. The dual-bearing reel speed change operation mechanism according to claim 2, wherein
the base member further includes
a first plate member having a sixth through hole in which the first protrusion is inserted, the sixth through hole being configured to allow the lock member urging member to be attached therein, and
a second plate member fixed to a back surface of the first plate member, the second plate member having a seventh through hole in which the first protrusion is inserted, the back surface facing opposite to the front surface of the base member.

4. The dual-bearing reel speed change operation mechanism according to claim 1, wherein
the base member is formed by press working.

5. The dual-bearing reel speed change operation mechanism according to claim 1, wherein
the fifth through hole of the lock member is formed to have a width greater than an outer diameter of the first protrusion of the handle arm.

6. The dual-bearing reel speed change operation mechanism according to claim 1, wherein
the handle arm further includes a second protrusion protruding from the front surface in the direction intersection with the longitudinal direction of the handle arm, and
the base member further includes an eighth through hole in which the second protrusion is inserted.

7. The dual-bearing reel speed change operation mechanism according to claim 6, wherein
the lock member further includes a ninth through hole elongated in the longitudinal direction of the member,
the second protrusion is inserted in the ninth through hole,
the ninth through hole is configured to restrict movement of the lock member by abutting the second protrusion.

8. The dual-bearing reel speed change operation mechanism according to claim 7, wherein
the ninth through hole of the lock member is formed to have a width greater than an outer diameter of the second protrusion.

* * * * *